J. C. SMITH.
ERASER.
APPLICATION FILED AUG. 2, 1915.
1,220,282. Patented Mar. 27, 1917.
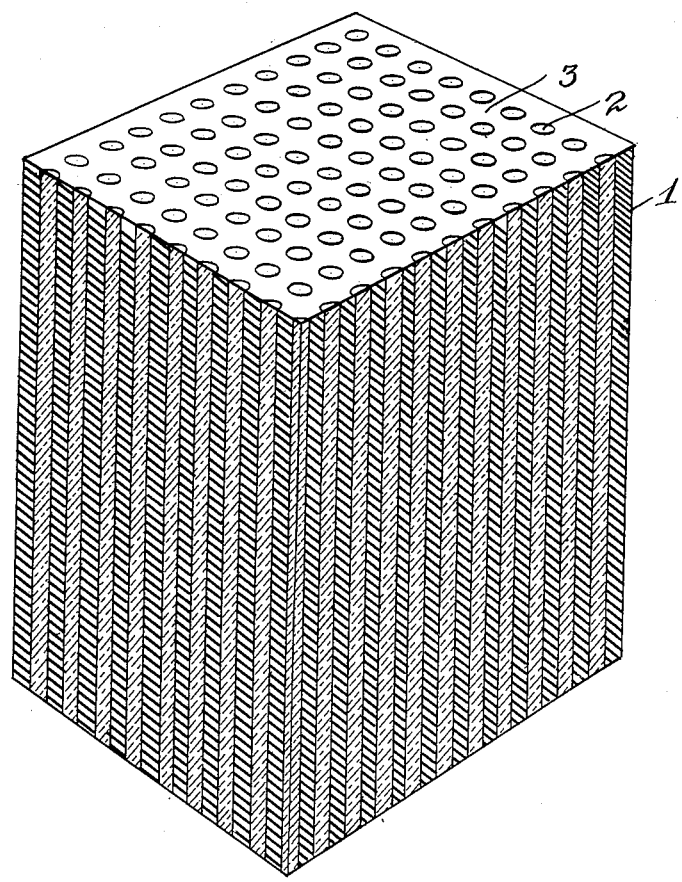
Inventor
Jesse Conrad Smith.
By
Attorney

UNITED STATES PATENT OFFICE.

JESSE CONRAD SMITH, OF KANSAS CITY, MISSOURI.

ERASER.

1,220,282. Specification of Letters Patent. Patented Mar. 27, 1917.

Application filed August 2, 1915. Serial No. 43,166.

*To all whom it may concern:*

Be it known that I, JESSE CONRAD SMITH, a citizen of the United States, residing at Kansas City, in the county of Jackson and State of Missouri, have invented certain new and useful Improvements in Erasers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to abrasive articles, and has for its principal object to provide a device of that character having the abrasive qualities of a glass scraper, but which comprises a plurality of scraping members which are automatically sharpened during use, whereby keen edges are constantly presented for engagement with a surface under treatment.

In accomplishing the above named object I have provided improved details of structure the preferred form of which is illustrated in the accompanying drawings, wherein the single figure is an enlarged sectional view of an abrasive article constructed according to my invention.

Referring more in detail to the drawings.

1 designates the article, which may be formed in any suitable shape or size according to the particular use for which it is intended, and which is composed of spun glass strands 2, embedded in a flexible binder 3 so that the ends of the glass strands are exposed at the ends of the inclosing body or binder, in order that when the end of the body is rubbed over a surface to be treated, the ends of the strands will rub on said surface to remove undesired matter therefrom.

With the glass strands embedded in a body of material which will wear away quickly, such as vulcanized oil or rubber substitute, when the article is rubbed over a surface, the ends of the glass strands will break off in minute particles and the binder will wear away quickly so that fresh ends of the strands are constantly presented for wear, thereby always providing a sharp keen abrasive surface on the article.

In manufacturing the eraser I spin the glass in strands of desirable fineness and cut them to the required length to fit within a given mold.

The glass strands are then placed in the mold so that they lie parallel with each other, with their ends terminating in substantial alinement. I then pour a binder or body, preferably of vulcanized oil or rubber substitute, into the mold about the glass strands, so that the latter are embedded in the binder to form a compact body.

When the binder has set about the spun glass strands, the elements form a combination or unit which may be rubbed over a surface to be treated so that the ends of the glass strands rub or scrape the surface to remove the undesired matter, the glass strands being continuously broken off in small particles so that the end of the strands constantly present a keen surface to the surface being treated, the binder material wearing away with the glass to continually expose the ends of the strands in the end of the binder body.

The body is flexible so that it can be easily handled and adapted for various uses and may, if desired, be placed in a suitable holder, although it is not necessary to use the holder, as the article can be used alone without damage to itself or injury to the user.

My invention may be adapted for use as an ink eraser, paint and varnish finisher, china burnisher, etc., and it is apparent that it may be made up in various sizes for different uses.

It is also within the scope of the invention to vary the density and resultant flexibility of the binder, as when used for some purposes the article should have sufficient flexibility to follow an uneven surface, while when it is intended for use only on flat surfaces its flexibility is not so material.

Having thus described my invention what I claim as new therein and desire to secure by Letters-Patent is:

1. An abrasive article comprising glass strands embedded in a relatively soft binder.

2. An abrasive article comprising glass strands embedded in a tenacious and relatively soft binder.

3. An abrasive article comprising glass strands embedded in a binder material of a nature to readily disintegrate under rubbing contact with another body.

4. An abrasive article comprising a body of vulcanized oil or rubber substitute and glass strands embedded in said body and lying in parallel relation, with the ends of the strands exposed at the ends of the embedding body.

5. An abrasive article comprising a binder of flexible and easily wearable material and glass strands embedded within the material and having their ends exposed at the end of the embedding body.

In testimony whereof I affix my signature.

JESSE CONRAD SMITH.